United States Patent
Shao et al.

(10) Patent No.: US 10,866,372 B2
(45) Date of Patent: *Dec. 15, 2020

(54) OPTICAL FIBER CONNECTOR AND METHOD OF ATTACHING AND DETACHING SAME

(71) Applicant: CommScope Telecommunications (Shanghai) Co. Ltd., Shanghai (CN)

(72) Inventors: Liang Shao, Shanghai (CN); Yanhong Yang, Shanghai (CN)

(73) Assignee: CommScope Telecommunications (Shanghai) Co. Ltd., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/437,433

(22) Filed: Jun. 11, 2019

(65) Prior Publication Data

US 2019/0293874 A1  Sep. 26, 2019

Related U.S. Application Data

(63) Continuation of application No. 15/541,968, filed as application No. PCT/CN2016/070150 on Jan. 5, 2016, now Pat. No. 10,345,536.

(30) Foreign Application Priority Data

Jan. 6, 2015 (CN) .......................... 2015 1 0004795
Jan. 6, 2015 (CN) ..................... 2015 2 0006150 U

(51) Int. Cl.
*G02B 6/38* (2006.01)
*G02B 6/42* (2006.01)

(52) U.S. Cl.
CPC ............. *G02B 6/389* (2013.01); *G02B 6/381* (2013.01); *G02B 6/3846* (2013.01);
(Continued)

(58) Field of Classification Search
CPC .... G02B 6/381; G02B 6/3846; G02B 6/3874; G02B 6/3887; G02B 6/389; G02B 6/4256
See application file for complete search history.

(56) References Cited

U.S. PATENT DOCUMENTS 4,693,550 A    9/1987  Brown et al.
5,230,032 A *  7/1993  Muzslay .................. G02B 6/25
                                                 385/139
(Continued)

FOREIGN PATENT DOCUMENTS

CN    202171660 U    3/2012
CN    202383324 U    8/2012
(Continued)

OTHER PUBLICATIONS

International Search Report and Written Opinion of the International Searching Authority for corresponding International Patent Application No. PCT/CN2016/070150 dated Mar. 25, 2016, 10 pages.
(Continued)

*Primary Examiner* — Peter Radkowski
(74) *Attorney, Agent, or Firm* — Merchant & Gould P.C.

(57) ABSTRACT

The present invention discloses an optical fiber connector, comprising: a housing, a ferrule installed within said housing; an end sleeve, connecting to the rear end of said housing; and an optical cable clamp, installed by insertion within said end sleeve, being provided for the purpose of clamping an optical cable. Said optical cable is secured within said optical cable clamp, and after said optical cable clamp is inserted and secured within said end sleeve, the optical fiber of said optical cable is inserted within said housing and butt-joined with the embedded optical fiber within said ferrule. As a result of this, before the butt-joined optical fibers are locked in, the optical cable has already been secured within the optical cable clamp and fixed to the
(Continued)

connector housing. Therefore, the butt-joined optical fibers cannot be separated due to the effects of unexpected pulling force, thus ensuring the optical fiber of the optical cable reliably abuts the embedded optical fiber.

21 Claims, 4 Drawing Sheets

(52) U.S. Cl.
CPC ......... *G02B 6/3874* (2013.01); *G02B 6/3887* (2013.01); *G02B 6/4256* (2013.01)

(56) References Cited

U.S. PATENT DOCUMENTS

| | | | |
|---|---|---|---|
| 5,261,020 A | 11/1993 | De Jong et al. | |
| 5,682,450 A | 10/1997 | Patterson et al. | |
| 5,732,174 A | 3/1998 | Carpenter et al. | |
| 5,748,819 A * | 5/1998 | Szentesi .............. | G02B 6/2551 385/60 |
| 5,802,230 A | 9/1998 | Kuribayashi et al. | |
| 6,302,592 B1 | 10/2001 | Zullig | |
| 6,623,177 B1 | 9/2003 | Chilton | |
| 7,090,406 B2 | 8/2006 | Melton et al. | |
| 7,591,595 B2 | 9/2009 | Lu et al. | |
| 8,480,314 B2 | 7/2013 | Saito et al. | |
| 10,345,536 B2 * | 7/2019 | Shao .................... | G02B 6/3846 |
| 2004/0161204 A1 | 8/2004 | Zimmel et al. | |
| 2004/0223720 A1 | 11/2004 | Melton et al. | |
| 2007/0211997 A1 | 9/2007 | Saito et al. | |
| 2008/0031573 A1 | 2/2008 | Droege et al. | |
| 2008/0107383 A1 | 5/2008 | Droege et al. | |
| 2008/0175542 A1 | 7/2008 | Lu et al. | |
| 2008/0304804 A1 * | 12/2008 | Zimmel .............. | G02B 6/3849 385/139 |
| 2009/0067789 A1 | 3/2009 | Droege et al. | |
| 2010/0034502 A1 | 2/2010 | Lu et al. | |
| 2010/0074588 A1 * | 3/2010 | Zimmel .............. | G02B 6/3849 385/139 |
| 2010/0098381 A1 | 4/2010 | Larson et al. | |
| 2010/0129031 A1 | 5/2010 | Danley et al. | |
| 2010/0322568 A1 | 12/2010 | Zimmel et al. | |
| 2011/0019964 A1 | 1/2011 | Nhep et al. | |
| 2011/0079930 A1 | 4/2011 | Saito et al. | |
| 2011/0188813 A1 * | 8/2011 | Marcouiller ......... | G02B 6/3849 385/78 |
| 2011/0268391 A1 | 11/2011 | Wang et al. | |
| 2012/0045177 A1 | 2/2012 | Droege et al. | |
| 2014/0064665 A1 | 3/2014 | Ott et al. | |

FOREIGN PATENT DOCUMENTS

| | | |
|---|---|---|
| CN | 202735548 U | 2/2013 |
| CN | 103364887 A | 10/2013 |
| CN | 203587843 U | 5/2014 |
| CN | 204389736 U | 6/2015 |
| JP | 2010-134102 A | 6/2010 |
| JP | 2010-134103 A | 6/2010 |
| WO | 92/19998 A1 | 11/1992 |

OTHER PUBLICATIONS

Chinese Office Action for corresponding Chinese Patent Application No. 201510004795.8 dated Apr. 6, 2017, 12 pages.
Extended European Search Report for corresponding European Patent Application No. 16734907.5 dated Jun. 12, 2018, 8 pages.

* cited by examiner ction is a Continuation of U.S. patent application Ser. No. 15/541,968, filed on 22 Nov. 2017, now U.S. Pat. No. 10,345,536, which is a National Stage Application of PCT/CN2016/070150, filed on 5 Jan. 2016, which claims the benefit of Chinese patent application 201510004795.8 submitted to the State Intellectual Property Office of the People's Republic of China on 6 Jan. 2015, and claims the benefit of Chinese patent application 201520006150.3 submitted to the State Intellectual Property Office of the People's Republic of China on 6 Jan. 2015, the disclosures of which are hereby incorporated by reference in their entireties. To the extent appropriate, a claim of priority is made to each of the above disclosed applications.

OPTICAL FIBER CONNECTOR AND METHOD OF ATTACHING AND DETACHING SAME

TECHNICAL FIELD

The present invention relates to a type of optical fiber connector, in particular to that of an optical fiber connector that allows rapid on-site attachment and detachment.

PRIOR ART

In the prior art, the process by which rapid on-site assembly of optical fiber connectors takes place generally comprises the following steps: 1) the external skin of the optical cable is stripped off, as is the protective layer of the optical fiber, and the optical fiber sliced; 2) the optical fiber of the optical cable is inserted into the connector housing and abutted to the embedded optical fiber within the housing; 3) the abutted optical cable optical fiber and the embedded optical fiber are locked in; and 4) the optical cable is secured to the connector housing.

In terms of the rapid onsite abutting of such optical fiber connectors, the following problems exist in the installation process: due to the complexity of on-site installation environments, after abutted optical fibers have been locked in, and prior to securing the optical cable, the optical cable may be unexpectedly subjected to tension resulting in optical fiber of optical cable that has already been locked in being pulled out, apart from which, in the course of securing optical cable, it is easy to damage the butt-join between optical fibers.

The reason for said problems occurring in the prior art is that the optical cable securing step occurs after the optical fiber locking takes place. If the optical cable securing step takes place before the optical fiber locking step, an extremely effective butt-join between optical fibers can be ensured.

In addition, at the time of abutting the optical cable optical fiber and embedded optical fiber, in order to ensure reliable contact between the end surface of the optical cable optical fiber and the end surface of the embedded optical fiber, a slight curve is introduced to the optical cable optical fiber when butt-joining, and by exerting a certain amount of pre-exerted thrust on the end surface of the optical cable optical fiber and the embedded optical fiber as a result of a suitably deformed curved shaped in the optical cable optical fiber, it is possible to ensure that reliable contact is maintained between the end surface of the optical cable optical fiber and the embedded optical fiber end surface. In the prior art, however, once the optical cable has been securely fixed, it is not possible to release the slight curvature that occurs from butt-joining the optical cable optical fiber. In view of this, when said optical fiber connector is connected to another optical fiber connector via an optical fiber adapter, the slight curvature of the optical cable optical fiber increases (since when two optical fiber connectors are connected, the optical cable optical fiber is subjected to the axial thrust of a spring), thus affecting the optical performance of the two connected optical fiber connectors.

SCOPE OF THE INVENTION

The aim of the present invention is to resolve at least one aspect of the aforementioned problems and drawbacks encountered in the prior art.

One aim of the present invention is to provide an optical fiber connector, said optical fiber connector being capable of ensuring a reliable butt-join between the optical cable optical fiber and the embedded optical fiber.

A further aim of the present invention is to provide an optical fiber connector, said optical fiber connector being suited to rapid on-site attachment and detachment.

According to one aspect of the present invention, an optical fiber connector is provided, which consists of: a housing; a ferrule installed within said housing; an end sleeve, connecting to the rear end of said housing; and an optical cable clamp, inserted into said end sleeve, for the purposes of clamping the optical cable. Said optical cable is secured within said optical cable clamp, and after said optical cable clamp has been inserted and secured within said end sleeve, an optical fiber of said optical cable is inserted into said housing and butt-jointed to an embedded optical fiber within the ferrule.

According to one embodiment of the present invention, said end sleeve and said optical cable clamp are structured in such a way that allows said optical cable clamp to be retained within said end sleeve in a separate first position and second position; when said optical cable clamp is retained in said first position, the optical fiber of said optical cable is subjected to thrust by said optical cable clamp causing it to curve; and when said optical cable clamp is retained in said second position, the optical fiber of said optical cable is no longer subjected to thrust by said optical cable clamp and straightens again.

According to a further embodiment of the present invention, a pair of elastic reeds is formed on the external wall of said optical cable clamp, there being paired positioning lugs formed on the internal wall of said end sleeve; when the optical cable clamp, within which an optical cable is fastened, is inserted into said end sleeve, the pair of elastic reeds of said optical cable clamp are such that they separately rest against the paired positioning lugs of said end sleeve, allowing for the retention of said optical cable clamp in said first position; when said optical cable clamp is retained in said first position, the optical fiber of said optical cable is subjected to thrust by said optical cable clamp, causing it to curve, which is convenient in terms of the effective butt-joining of the end surface of said optical cable optical fiber and the embedded optical fiber end surface.

According to another illustrative embodiment of the present invention, said positioning lugs possess an arced external surface, as a result of which the paired elastic reeds of the optical cable clamp are able to slide past said positioning lugs when subjected to a predetermined tension.

According to another illustrative embodiment of the present invention, said positioning lugs possess smooth semi-spherical external surfaces.

According to another illustrative embodiment of the present invention, a pair of retaining protrusions are provided on the internal wall of said end sleeve, said pair of retaining protrusions being positioned behind said paired positioning lugs; when an optical cable in the first position is subjected to a predetermined tension, the elastic reeds on said optical cable clamp slide past the positioning lugs, and connect with said retaining protrusions, as a result of which said optical cable clamp is retained in said second position, thus preventing the optical cable clamp from being pulled out of said end sleeve; additionally, when said optical cable clamp is retained in said second position, the optical fiber of said optical cable is no longer subjected to thrust by said optical cable clamp, and straightens again.

According to another illustrative embodiment of the present invention, paired flexible arms are formed on the lateral wall of said end sleeve, said paired flexible arms being such that they may separately exert pressure on the paired elastic reeds of said optical cable clamp, thus allowing the disconnection of said paired elastic reeds from said retaining protrusions.

According to another illustrative embodiment of the present invention, said positioning lugs are formed on the internal surfaces of said flexible arms; additionally, when said flexible arms exert pressure on said elastic reeds, said positioning lugs exert pressure directly on said elastic reeds.

According to another illustrative embodiment of the present invention, said flexible arms possess raised sections, said raised sections protruding externally from openings formed in the lateral walls of said end sleeve.

According to another illustrative embodiment of the present invention, said optical fiber connector also comprises of a dust cap in a sleeved arrangement on the front end of said ferrule.

According to another illustrative embodiment of the present invention, said optical fiber connector also comprises a V-shaped alignment slot located within said housing, the optical fiber within said optical cable and the embedded optical fiber within said ferrule being butt-joined within said V-shaped alignment slot.

According to another illustrative embodiment of the present invention, said optical fiber connector further comprises an optical fiber locking mechanism installed within said housing, said optical fiber locking mechanism being such that it allows the optical cable optical fiber and embedded optical fiber that have already been butt-joined to be locked in an appropriate position.

According to another aspect of the present invention, a method of attaching an optical fiber connector is provided, comprising of the following steps:

S110: pre-prepared optical cable is secured in an optical cable clamp; and

S120: the optical cable clamp within which the optical cable is securely fastened is secured to the connector housing, then the optical fiber of the optical cable is inserted into the housing of the connector, resulting in the optical cable optical fiber being butt-joined with the embedded optical fiber within the connector housing; and S130: the butt-joined optical cable optical fiber and the embedded optical fiber being locked in.

According to one illustrative embodiment of the present invention, said optical cable clamp is installed by insertion within an end sleeve, said end sleeve being connected to the rear end of the housing of said connector, thus allowing said optical cable clamp to be secured to the housing of said connector.

According to another illustrative embodiment of the present invention, said end sleeve and said optical cable clamp are structured in such a way that allows said optical cable clamp to be retained within said end sleeve in a separate first position and second position; when said optical cable clamp is retained in said first position, the optical fiber of said optical cable is subjected to thrust by said optical cable clamp causing it to curve; additionally, when said optical cable clamp is retained in said second position, the optical fiber of said optical cable is no longer subjected to thrust by said optical cable clamp and straightens again.

According to one illustrative embodiment of the present invention, the aforementioned optical fiber connector attachment method is such that it is an optical fiber connector as mentioned in any of the foregoing embodiments.

According to another illustrative embodiment of the present invention, in the aforementioned step S120, the pair of elastic reeds of said optical cable clamp are such that they separately rest against the paired positioning lugs of said end sleeve, allowing for the retention of said optical cable clamp in said first position.

According to another illustrative embodiment of the present invention, the previously mentioned method also includes the following step:

S140: pulling said optical cable clamp outwards, causing the elastic reeds of said optical cable clamp to slide over the positioning lugs and to connect with the retaining protrusions on said end sleeve, thus causing said optical cable clamp to remain in said second position.

According to another aspect of the present invention, a method for detaching an optical fiber connector is provided, comprising the following steps:

S210: unlocking of said optical cable optical fiber and the embedded optical fiber;

S220: exerting pressure inwards on the raised sections of the paired flexible arms, thus causing the paired flexible arms to exert pressure separately on the pair of elastic reeds of the optical cable clamp, thus releasing the connection between the elastic reeds and the retaining protrusions; and S230: pulling outwards of said optical cable clamp allowing the removal of said optical cable clamp from said end sleeve.

In the various embodiments of the optical fiber connector according to the present invention, the optical cable is first secured within an optical fiber clamp, after which the optical cable clamp within which the optical cable is fixed is secured to the connector housing, the optical fiber of the optical cable being inserted into the housing of the connector at the same time, undergoing butt-joining with the embedded optical fiber within the housing; then once the optical fibers have been butt-joined, the butt-joined optical fibers are then locked in. Consequently, in the present invention, before the butt-joined optical fibers are locked in, the optical cable has already been secured to the optical cable clamp and fixed to the housing of the connector; as a result, the optical fibers that have already been butt-joined are not subjected to the effects of unexpected tension, thus ensuring an effective butt-join between the optical cable optical fiber and the embedded optical fiber.

Furthermore, in certain embodiments of the present invention, the interaction between the end sleeve and the optical cable clamp releases the slight curvature that occurs from butt-joining the optical cable optical fiber, thus improving the optical performance of the optical fiber connector.

The descriptions of the present invention in the following text taken in conjunction with the appended diagrams clarify the various aims and advantages of the invention, and are of assistance in gaining a full understanding of the present invention.

EMBODIMENTS

The following implementations, taken in conjunction with the appended diagrams, provide a more detailed description of the technical schemes of the present invention. Within the Description, numbering that is the same or similar occurring in the appended diagrams refers to components that are the same or similar. The aim of the following description of the modes of implementation of the invention, taken in conjunction with the appended diagrams, is to aid in interpretation of the overall conceptual framework of this invention, and should not be understood as restricting the present invention in any way.

Furthermore, in the following detailed descriptions, for convenience of interpretation, many specific details are provided in order to allow a full understanding of the implementations disclosed. It should be clear that, one or more implementations would be possible without these specific details. In all other cases, structures and apparatus which are common knowledge are represented graphically to allow simplification of the appended diagrams.

An overall technical conceptualisation according to the present invention, provides an optical fiber connector, comprising: a housing; a ferrule installed within said housing; an end sleeve, connecting to the rear end of said housing; and an optical cable clamp, inserted into said end sleeve, for the purposes of clamping the optical cable. Said optical cable is secured within said optical cable clamp, and after said optical cable clamp has been inserted and secured within said end sleeve, the optical fiber of said optical cable is inserted into said housing and butt-jointed to an embedded optical fiber within the ferrule.

Figure 1:
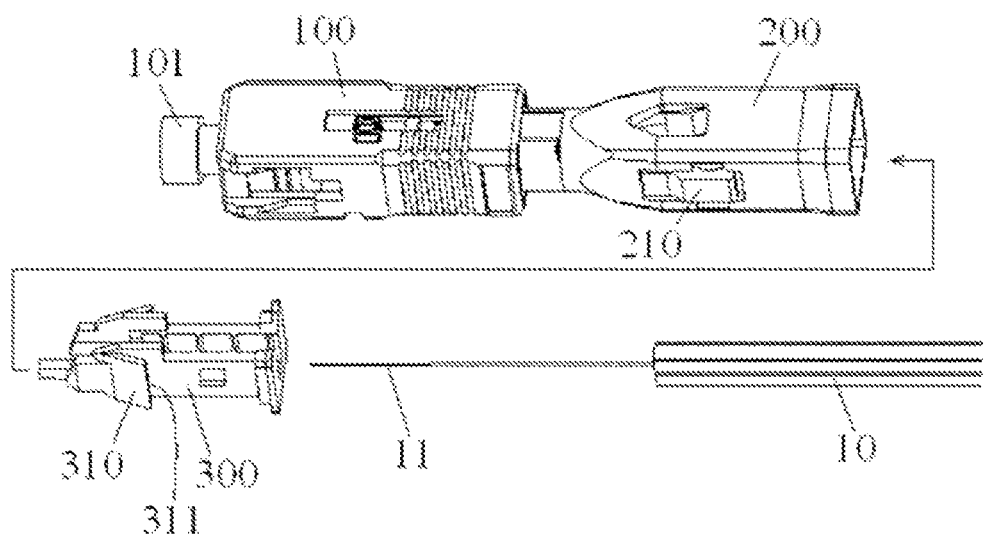
FIG. 1 is a segmented graphical representation of an embodiment of the optical fiber connector according to the present invention.

FIG. 1 is a segmented graphical representation of an embodiment of the optical fiber connector according to the present invention.

One illustrative embodiment of the present invention discloses an optical fiber connector. As is shown in FIG. 1, said optical fiber connector mainly comprises of a housing 100, a ferrule 110 (see FIG. 4) installed within said housing 100, an end sleeve 200 connecting to the rear end of the housing 100, and an optical cable clamp 300 suitable for installation by insertion into the end sleeve 200.

Figure 2:
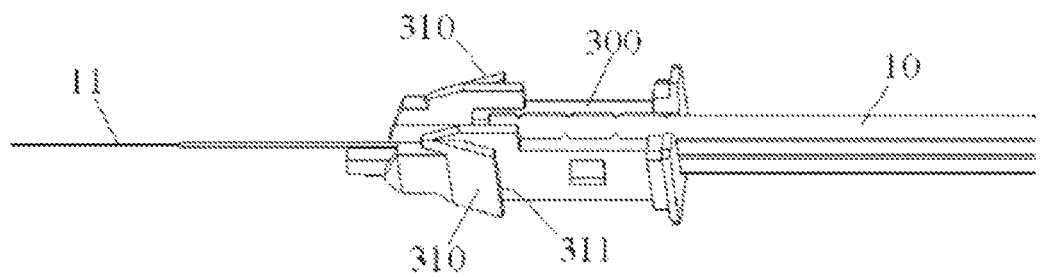
FIG. 2 is a graphical representation of the optical cable of the optical fiber connector as shown in FIG. 1 secured to the optical cable clamp.

FIG. 2 is a graphical representation of the optical cable 10 of the optical fiber connector as shown in FIG. 1 secured to the optical cable clamp 300.

As is shown in FIG. 1 and FIG. 2, the optical cable clamp 300 is provided for the purpose of clamping pre-prepared optical cable 10. Here, pre-prepared optical cable 10 refers to: optical cable 10 from which a section of outer skin has been stripped, optical fiber 11 from which a section of the protective layer has been stripped, the exposed end section of the optical fiber 11 having been processed by being sliced and polished.

Figure 3:
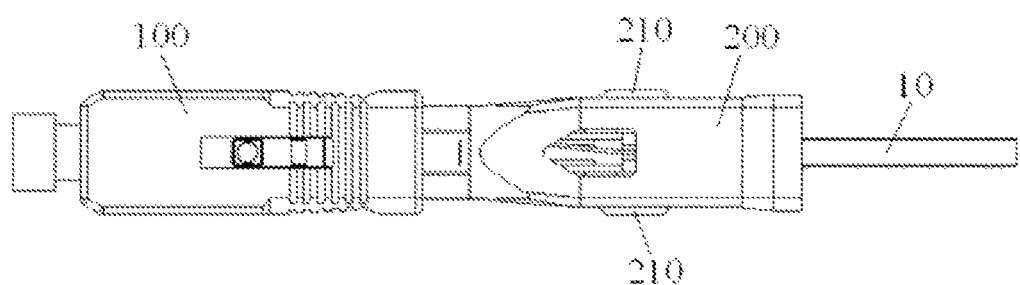
FIG. 3 is a graphical representation of the optical cable clamp to which the optical cable has already been securely installed by insertion into the end sleeve.
Figure 4:
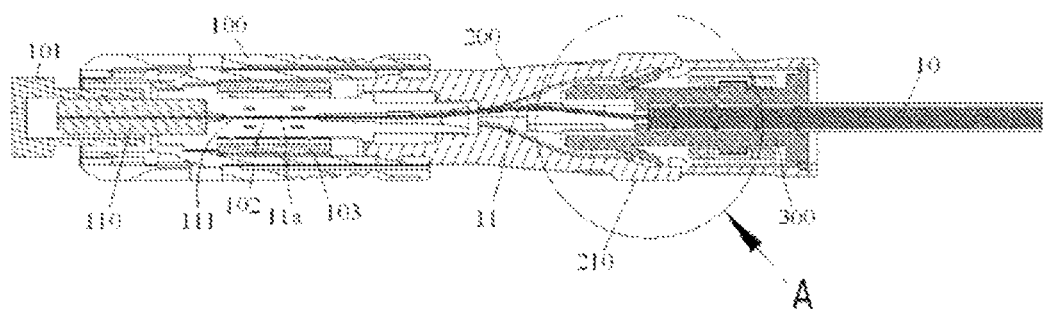
FIG. 4 is a representation of a vertical cross-section of the optical fiber connector in FIG. 3.

FIG. 3 is a graphical representation of the optical cable clamp 300 to which the optical cable 10 has already been securely installed by insertion into the end sleeve 200; FIG. 4 is a representation of a vertical cross-section of the optical fiber connector in FIG. 3.

As is shown in FIG. 1 to FIG. 4, once the optical cable clamp 300 to which the optical cable 10 has been securely fastened is inserted and secured within the end sleeve 200, the optical fiber 11 within the optical cable 10 is inserted into the housing 100 and butt-joined with the embedded optical fiber 111 within the ferrule 110.

Figure 5:
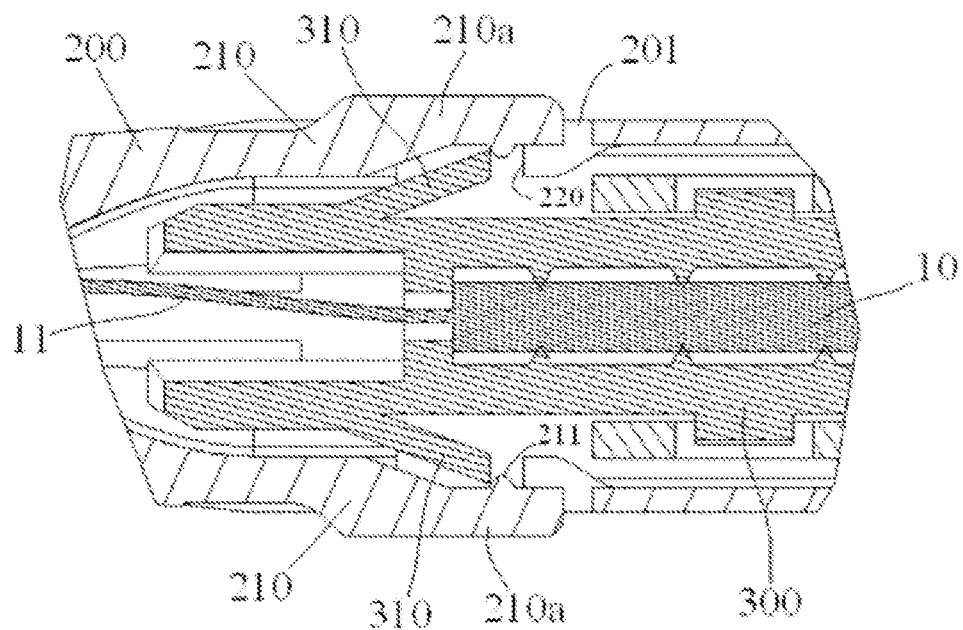
FIG. 5 is a magnified graphical representation of section A of the optical fiber connector shown in FIG. 4, wherein the optical cable optical fiber 11 has thrust exerted on it by the optical cable clamp, resulting in appropriate curvature.

FIG. 5 is a magnified graphical representation of section A of the optical fiber connector shown in FIG. 4, wherein the optical cable optical fiber 11 has thrust exerted on it by the optical cable clamp 300, resulting in appropriate curvature.

According to one illustrative embodiment of the present invention, as shown in FIG. 1 to FIG. 5, paired elastic reeds 310 are formed on the external wall of said optical cable clamp 300, there being paired positioning lugs 211 formed on the internal wall of said end sleeve 200. When the optical cable clamp 300 to which the optical cable 10 has been fastened is inserted into the end sleeve 200, as shown in FIG. 5, the paired elastic reeds 310 of said optical cable clamp 300 separately rest on the paired positioning lugs 211 of said end sleeve 200, allowing for the retention of said optical cable clamp 300 in said first position. When the optical cable clamp 300 is retained in the first position (the position shown in FIG. 5), the optical fiber 11 of the optical cable 10 is subjected to thrust by the optical cable clamp 300, causing it to curve slightly, which is convenient in terms of the reliable butt-joining of the end surface of the optical cable 10 optical fiber 11 and the end surface of the embedded optical fiber 111 within the ferrule 110.

Figure 6:
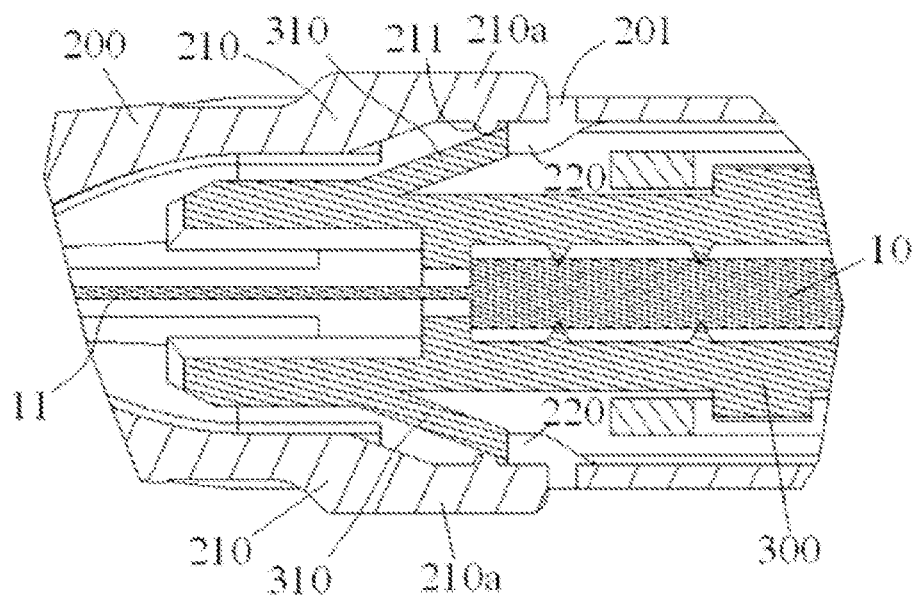
FIG. 6 is a magnified graphical representation of section A of the optical fiber connector shown in FIG. 4, wherein the curvature in the optical cable optical fiber 11 has been released, with it having straightened.

FIG. 6 is a magnified graphical representation of section A of the optical fiber connector shown in FIG. 4, wherein the curvature in the optical cable optical fiber 11 has been released and it has straightened again.

In an illustrative embodiment of the present invention, as is shown in FIG. 1 to FIG. 6, a pair of retaining protrusions 220 are also formed on the internal wall of said end sleeve 200, said pair of retaining protrusions 220 being positioned behind said paired positioning lugs 211. As shown in FIG. 5 and FIG. 6, when optical cable clamp 300 in the first position is subjected to a predetermined tension, the elastic reeds 310 on said optical cable clamp 300 slide past the positioning lugs 211, and connect with said retaining protrusions 220, as a result of which said optical cable clamp 300 is retained in said second position, thus preventing the optical cable clamp 300 from being pulled out of said end sleeve 200. When the optical cable clamp 300 is retained in the second position (the position shown in FIG. 6), the thrust of the optical cable clamp 300 on the optical fiber 11 of the optical cable 10 is released, and it straightens again.

In this manner, the interaction between the end sleeve 200 and the optical cable clamp 300 releases the slight curvature that occurs from butt-joining the optical cable optical fibers, thus improving the optical performance of the optical fiber connector.

In an illustrative embodiment of the present invention, as shown in FIG. 5 and FIG. 6, the positioning lugs 211 possess an arced external surface, as a result of which the paired elastic reeds 310 of the optical cable clamp 300 are able to slide past the positioning lugs 211 when subjected to a predetermined tension.

In an illustrative embodiment of the present invention, said positioning lugs 211 possess smooth semi-spherical external surfaces.

With reference to FIG. 1 to FIG. 6, in the embodiment shown, paired flexible arms 210 are formed on the lateral wall of the end sleeve 200. The paired flexible arms 210 being such that they may separately exert pressure on the paired elastic reeds 310 of the optical cable clamp 300, thus allowing the disconnection of the paired elastic reeds 310 from the retaining protrusions 220.

Continuing to refer to FIG. 5 and FIG. 6, in the embodiment shown in the drawings, the positioning lugs 211 are formed on the internal surfaces of the flexible arms 210, and when the flexible arms 210 exert pressure on the elastic reeds 310, the positioning lugs 211 exert pressure directly on the elastic reeds 310.

Figure 7:
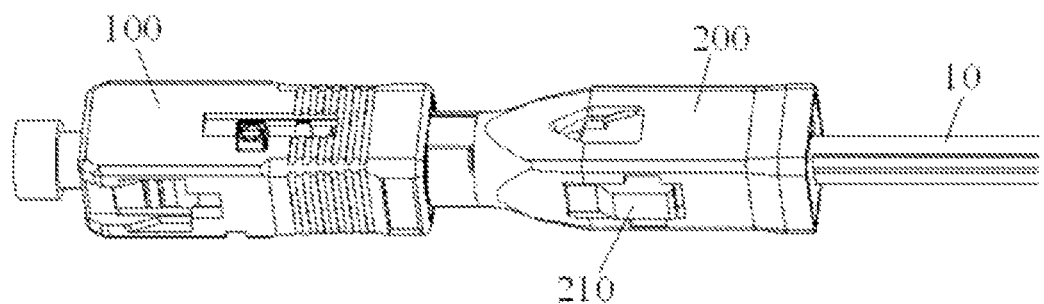
FIG. 7 is a three-dimensional graphical representation of an illustrative embodiment of an optical fiber connector that has already been attached.

FIG. 7 is a three-dimensional graphical representation of an illustrative embodiment of an optical fiber connector that has already been attached.

As shown in FIG. 5, FIG. 6 and FIG. 7, in one illustrative embodiment of the present invention, the flexible arms 210 possess raised sections 210a, the raised sections 210a protruding externally from the openings 201 formed in the lateral walls of the end sleeve 200. The result of this being that, it allows one to conveniently exert manual pressure on the paired flexible arms 210.

As shown in FIG. 4, in an illustrative embodiment of the present invention, the optical fiber connector also comprises a dust cap 101 in a sleeved arrangement on the front end of the ferrule 110.

As shown in FIG. 4, in one illustrative embodiment of the present invention, the optical fiber connector also comprises a V-shaped alignment slot 102 located within the housing 100, the optical fiber 11 within the optical cable 10 and the embedded optical fiber 111 within the ferrule 110 being butt-joined within the V-shaped alignment slot 102. As is shown in FIG. 4, the front-end section 11a of the optical fiber 11 of the optical cable 10 and the rear end section of the embedded optical fiber 111 are contained within the V-shaped alignment slot 102, being aligned with each other and coming into contact with each other, thus achieving the optical butt-joining of the optical cable optical fiber 11 and the embedded optical fiber 111.

As shown in FIG. 4, in one illustrative embodiment of the present invention, the optical fiber connector also comprises an optical fiber locking mechanism 103, the optical fiber locking mechanism 103 being such that it allows the optical cable optical fiber 11 and embedded optical fiber 111, that have already been butt-joined, to be locked in an appropriate position. Furthermore, the locking in of the optical fibers 11 and 111 that the optical fiber locking mechanism 103 causes can be released.

The following taken in conjunction with FIG. 1 to FIG. 7 provides a detailed description of the process for attaching the optical fiber connector of an embodiment of the present invention:

S110: as is shown in FIG. 2, the pre-prepared optical cable 10 is secured in an optical cable clamp 300; and S120: as shown in FIG. 3, FIG. 4 and FIG. 5, the optical cable clamp 300, within which the optical cable 10 is securely fastened, is fixed to a connector housing 100, the optical fiber 11 of the optical cable 10 then being inserted into the housing 100 of the connector, resulting in the optical cable optical fiber 11 being butt-joined with the embedded optical fiber 111 within the connector housing 100; and S130: the butt-joined optical cable optical fiber 11 and the embedded optical fiber 111 being locked in.

According to the above mentioned attachment method, the optical cable clamp 300 is installed by insertion within the end sleeve 200, the end sleeve 200 being connected to the rear end of the housing 100 of the connector, thus allowing the optical cable clamp 300 to be fixed to the housing 100 of the connector.

Within the aforementioned optical fiber connector attachment method, the optical fiber connector may be an optical fiber connector according to any of the aforementioned embodiments.

In the aforementioned attachment method, in step S120, the paired elastic reeds 310 of the optical cable clamp 300 separately rest on the paired positioning lugs 211 of the end sleeve 200, allowing for the retention of the optical cable clamp 300 in the first position (the position shown in FIG. 5). As is shown in FIG. 5, when the optical cable clamp 300 is retained in the first position, the optical fiber 11 of the optical cable 10 is subjected to thrust by the optical cable clamp 300, causing it to curve, which is convenient in terms of reliable butt-joining of the end surface of the optical cable 10 optical fiber 11 and the end surface of the embedded optical fiber 111 within the ferrule 110.

According to one illustrative embodiment of the present invention, the aforementioned attachment method also comprises the following steps:

S140: relying on the optical cable 10 to pull the optical cable clamp 300 outwards, causing the elastic reeds 310 of the optical cable clamp 300 to slide over the positioning lugs 211, connecting with the retaining protrusions 220 on the end sleeve 200.

As shown in FIG. 6, when the elastic reeds 310 on the optical cable clamp 300 connect with the retaining protrusions 220 on the end sleeve 200, the optical cable clamp 300 is retained within the end sleeve 200 in the second position. At this point, as shown in FIG. 6, the thrust of the optical cable clamp 300 on the optical fiber 11 of the optical cable 10 is released, and it straightens again, while the optical cable clamp 300 cannot be pulled out of the end sleeve 200.

Figure 8:
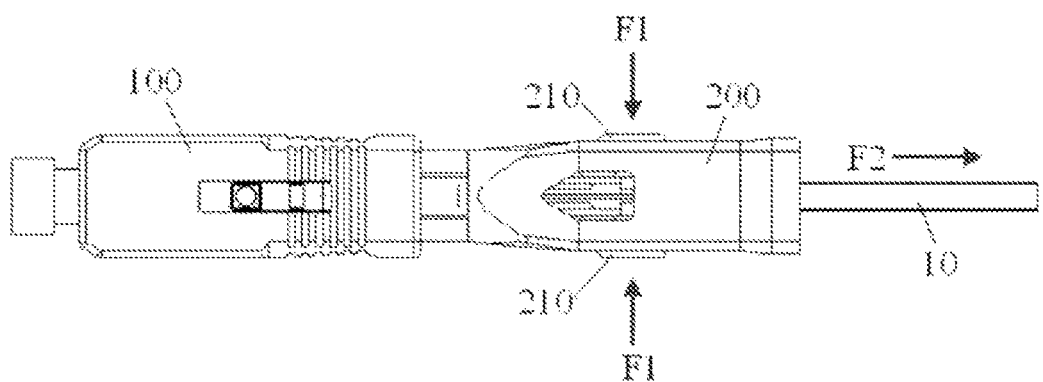
FIG. 8 is a disassembled graphical representation according to an illustrative embodiment of the optical fiber connector shown in FIG. 7.

FIG. 8 is a disassembled graphical representation according to an illustrative embodiment of the optical fiber connector shown in FIG. 7.

The following taken in conjunction with FIG. 1 to FIG. 8 provides a detailed description of the method for detaching an attached optical fiber connector according to an embodiment of the present invention:

S210: unlocking of said optical cable optical fiber 11 and the embedded optical fiber 111;

S220: the raised sections 210a of the paired flexible arms 210 in FIG. 8 are pressed inwards in the direction of the arrows F1, causing the paired flexible arms 210 to separately press on the paired elastic reeds 310 of the optical cable clamp 300, allowing the connection between the elastic reeds 310 and the retaining protrusions 220 to be released; and S230: pulling outward of the optical cable clamp 300 in the direction indicated by arrow F2 in FIG. 8, allowing for the removal of the optical cable clamp 300 from the end sleeve 200.

In this manner, the optical cable clamp 300 to which the optical cable 10 is secured may be pulled out of the end sleeve 200, thus achieving the rapid on-site detachment of the optical fiber connector.

As would be appreciated by a person skilled in the art, the embodiments mentioned above are provided merely for example, and a person skilled in the art would be able to carry out improvements to these embodiments, whereby as long as these do not conflict with the structures or principles described in these embodiments, they may be freely assembled.

Regardless of the fact that the present invention has been described in conjunction with the appended diagrams, the aim of the embodiments to which the appended diagrams relate is purely to provide illustrative descriptions of preferred implementations of the invention, and should not be understood as constituting any kind of restriction on the present invention.

Regardless of the fact certain embodiments which represent the overall concepts of the present invention have been displayed and described, an average technician in this field would be able to make various modifications to these embodiments which do not depart from the principles and spirit embodied by the concepts of this invention, the scope of this invention being defined by the claims and their equivalents.

It should be understood that, the wording "including" does not exclude other components or steps. Furthermore, the labelling of any component in the claims should not be understood as restricting the scope of the present invention in any way.

The invention claimed is:

1. An optical fiber connector comprising:
   a connector housing having a first end and a second end;
   an end sleeve mounted at the second end of the connector housing, the end sleeve including a pair of flexible arms formed on a lateral wall of the end sleeve, wherein the pair of flexible arms include raised sections, the raised sections protruding externally from openings formed in the lateral walls of the end sleeve;
   an optical cable clamp positioned within the end sleeve; and
   a fiber optic cable being pre-secured within the optical cable clamp.

2. The optical fiber connector according to claim 1, wherein an optical fiber of the fiber optic cable extends into the connector housing and reliably abuts a stub fiber positioned within the optical fiber connector.

3. The optical fiber connector according to claim 2, wherein the stub fiber is supported by a ferrule positioned within the connector housing.

4. The optical fiber connector according to claim 2, wherein the optical cable clamp is configured to be retained within the end sleeve in a separate first position and second position;
   when the optical cable clamp is retained in the first position, the optical fiber of the fiber optic cable is subjected to thrust by the optical cable clamp, causing it to curve; and
   when the optical cable clamp is retained in the second position, the optical fiber of the fiber optic cable is no longer subjected to thrust by the optical cable clamp, and straightens again.

5. The optical fiber connector according to claim 4, wherein a pair of elastic reeds are formed on an external wall of the optical cable clamp, and a pair of positioning lugs are formed on an internal wall of the end sleeve, and the pair of elastic reeds of the optical cable clamp are adapted to separately rest against the pair of positioning lugs of the end sleeve, allowing the retention of the optical cable clamp in the first position.

6. The optical fiber connector according to claim 5, wherein the pair of positioning lugs include an arced external surface such that the pair of elastic reeds of the optical cable clamp slide past the pair of positioning lugs when subjected to a predetermined tension, and wherein the pair of elastic reeds are disconnected from the pair of positioning lugs.

7. The optical fiber connector according to claim 6, wherein the pair of positioning lugs include smooth semi-spherical external surfaces.

8. The optical fiber connector according to claim 5, wherein a pair of retaining protrusions are provided on the internal wall of the end sleeve, the pair of retaining protrusions being positioned behind the pair of positioning lugs;
   when the optical cable clamp in the first position is subjected to a predetermined tension, the pair of elastic reeds on the optical cable clamp are adapted to slide past the pair of positioning lugs and engage the pair of retaining protrusions such that the optical cable clamp is retained in the second position, and wherein the optical cable clamp is prevented from being pulled out of the end sleeve.

9. The optical fiber connector according to claim 8, wherein the pair of flexible arms are being configured to separately exert pressure on the pair of elastic reeds of the optical cable clamp to allow disconnection of the pair of elastic reeds from the pair of retaining protrusions.

10. The optical fiber connector according to claim 9, wherein the pair of positioning lugs are formed on internal surfaces of the pair of flexible arms; additionally, when the pair of flexible arms exert pressure on the pair of elastic reeds, the pair of positioning lugs exert pressure directly on the pair of elastic reeds.

11. The optical fiber connector according to claim 3, wherein the optical fiber connector further comprises a dust cap in a sleeved arrangement on a front-end of the ferrule.

12. The optical fiber connector according to claim 3, wherein the optical fiber connector further comprises a V-shaped alignment slot located within the connector housing, the optical fiber of the fiber optic cable being configured to abut with the stub fiber of the ferrule within the V-shaped alignment slot.

13. The optical fiber connector according to claim 2, wherein the optical fiber connector further comprises an optical fiber locking mechanism installed within the connector housing, the optical fiber locking mechanism being configured to allow the optical fiber of the fiber optic cable and the stub fiber to be locked in an appropriate position.

14. An optical fiber connector, comprising:
   a connector housing having a front end and a rear end, the rear end of the connector housing having an anchoring interface;
   an optical cable clamp being pre-secured to an optical cable, the optical cable clamp having a main body and a pair of elastic reeds formed on an external wall of the main body, the optical cable clamp defining a pocket in the external wall for receiving the fiber optic cable, wherein the anchoring interface of the connector housing is adapted to connect the optical cable clamp to the rear end of the connector housing.

15. The optical fiber connector according to claim 14, further comprising an optical fiber stub positioned within a ferrule, the optical fiber stub extending rearwardly from the ferrule.

16. The optical fiber connector according to claim 15, wherein when the optical cable clamp is connected to the connector housing, an optical fiber of the optical cable extends into the optical fiber connector and abuts the optical fiber stub such that a predetermined amount of buckling is achieved.

17. An optical fiber connector comprising:
- a main connector body having a first end and a second end;
- a ferrule positioned within the main connector body, the ferrule supporting an optical fiber stub that extends rearwardly from the ferrule;
- an end sleeve mounted at the second end of the main connector body; and
- an optical cable clamp positioned within the end sleeve, the optical cable clamp being pre-secured to an optical fiber of a fiber optic cable that extends into the optical fiber connector such that the optical fiber abuts the optical fiber stub positioned within the ferrule, the optical cable clamp including an end flange having a rectangular transverse cross-sectional shape configured such that the optical cable clamp is non-rotatable within the end sleeve, and the end flange defining a pocket for receiving the fiber optic cable.

18. The optical fiber connector according to claim 17, wherein the optical cable clamp is configured to be retained within the end sleeve in a separate first position and second position;
- when the optical cable clamp is retained in the first position, the optical fiber of the fiber optic cable is subjected to thrust by the optical cable clamp, causing it to curve; and
- when the optical cable clamp is retained in the second position, the optical fiber of the fiber optic cable is no longer subjected to thrust by the optical cable clamp, and straightens again.

19. The optical fiber connector according to claim 17, wherein a pair of elastic reeds are formed on an external wall of the optical cable clamp, and a pair of positioning lugs are formed on an internal wall of the end sleeve; and the pair of elastic reeds of the optical cable clamp are adapted to separately rest against the pair of positioning lugs of the end sleeve.

20. The optical fiber connector according to claim 19, wherein the pair of positioning lugs include an arced external surface such that the pair of elastic reeds of the optical cable clamp slide past the pair of positioning lugs when subjected to a predetermined tension, and wherein the pair of elastic reeds are disconnected from the pair of positioning lugs.

21. The optical fiber connector according to claim 17, further comprising an optical fiber locking mechanism installed within the main connector body, the optical fiber locking mechanism being configured to allow the optical fiber of the fiber optic cable and the optical fiber stub to be locked in an appropriate position.

\* \* \* \* \*